United States Patent
Shadle

(10) Patent No.: US 10,889,423 B2
(45) Date of Patent: Jan. 12, 2021

(54) BONDING LABEL

(71) Applicant: W/S Packaging Group, Inc., Green Bay, WI (US)

(72) Inventor: Mark A. Shadle, Peachtree City, GA (US)

(73) Assignee: W/S Packaging Group, Inc., Green Bay, WI (US)

( * ) Notice: Subject to any disclaimer, the term of this patent is extended or adjusted under 35 U.S.C. 154(b) by 41 days.

(21) Appl. No.: 16/253,910

(22) Filed: Jan. 22, 2019

(65) Prior Publication Data
US 2020/0231356 A1    Jul. 23, 2020

(51) Int. Cl.
*C09J 7/40*        (2018.01)
*B65D 77/24*       (2006.01)
*B65D 77/06*       (2006.01)

(52) U.S. Cl.
CPC ........... *B65D 77/24* (2013.01); *B65D 77/062* (2013.01); *C09J 7/403* (2018.01); *C09J 7/405* (2018.01)

(58) Field of Classification Search
CPC ........ B65D 77/24; B65D 77/062; C09J 7/403; C09J 2203/334
See application file for complete search history.

(56) References Cited

U.S. PATENT DOCUMENTS

| | | |
|---|---|---|
| 2,552,664 A | 4/1947 | Burdine |
| 2,800,215 A | 7/1957 | Converse |
| 5,458,938 A | 10/1995 | Nygard et al. |
| 5,587,214 A * | 12/1996 | Mitchell, Jr. .......... B31D 1/027 40/638 |
| 5,605,730 A | 2/1997 | Treleaven |
| 5,736,470 A | 4/1998 | Schneberger et al. |
| 6,948,743 B1 | 9/2005 | Peterson |
| 7,241,357 B2 | 7/2007 | Roth et al. |
| 7,475,912 B1 * | 1/2009 | Reffett ...................... B32B 7/06 283/101 |
| 8,043,993 B2 | 10/2011 | Roth et al. |
| 8,273,434 B2 | 9/2012 | Zietlow et al. |
| 8,602,214 B2 | 12/2013 | Raming |
| 9,908,359 B2 | 3/2018 | DeLise, Jr. |

(Continued)

FOREIGN PATENT DOCUMENTS

| | | |
|---|---|---|
| DE | 10148637 A1 | 6/2002 |
| EP | 0757937 A2 | 8/1995 |

(Continued)

*Primary Examiner* — Patricia L. Nordmeyer
(74) *Attorney, Agent, or Firm* — Brian B. Shaw, Esq.; Harter Secrest & Emery LLP

(57) ABSTRACT

A web of bonding labels includes a face stock and a release liner. The face stock has both a first adhesive layer and a first release layer on a top surface of the face stock and a second adhesive layer on a bottom surface of the face stock. The release liner has a second release layer on a top surface of the release liner arranged to protect the second adhesive layer on the bottom surface of the face stock and a third release layer on a bottom surface of the release liner. The face stock is separated into a succession of labels carried on the release liner such that each label includes a first complementary area defined on the top surface of the face stock by the first adhesive layer and a second larger complementary area that is at least as large as the first complementary area defined on the top surface of the face stock by the first release layer.

23 Claims, 7 Drawing Sheets

(56) References Cited

U.S. PATENT DOCUMENTS

| | | | |
|---|---|---|---|
| 2005/0087978 A1 | 4/2005 | Tucker | |
| 2009/0183410 A1 | 7/2009 | Tursso | |
| 2014/0137514 A1 | 5/2014 | Kennedy | |
| 2015/0279242 A1* | 10/2015 | Parks | G09F 3/10 428/41.7 |
| 2015/0368517 A1 | 12/2015 | Yasuzawa | |
| 2018/0010018 A1 | 1/2018 | Ma et al. | |
| 2018/0050842 A1 | 2/2018 | Emmott | |
| 2018/0072020 A1 | 3/2018 | Vigunas et al. | |

FOREIGN PATENT DOCUMENTS

| | | |
|---|---|---|
| EP | 0463193 B2 | 4/1999 |
| EP | 1107216 A2 | 6/2001 |
| EP | 0917124 B1 | 12/2004 |
| WO | 2018073140 A2 | 4/2018 |

* cited by examiner

10,889,423 B2

BONDING LABEL

TECHNICAL FIELD

The invention relates to bonding labels and particularly bonding labels for bonding one object surface to another object surface.

BACKGROUND OF THE INVENTION

Conventional labels include a face stock with an adhesive backing together with a release liner for protecting the adhesive backing prior to affixing the face stock to an object surface. Bonding labels include not only a backing adhesive for affixing the face stock to a first object surface but also include a top-side adhesive for bonding the face stock to a second object surface, which can be the surface of a different object. Together, the top-side and backing adhesives on opposites sides of the face stock provide for bonding the first and second object surfaces to each other.

Like the backing adhesive, the top-side adhesive requires protection against exposure to environmental influences that could weaken the adhesive prior to its intended use such as by unintended contact with other surfaces. A second release liner could be used to protect the top-side adhesive, but the addition of such a liner adds significantly to cost, creates extra waste, and requires an additional step of liner removal prior to bonding the top-side adhesive with a desired surface. Adhesive protection schemes are complicated by the need to protect the top-side and backing adhesive layers during different stages of intended use including during manufacture and transport of the labels in bulk and during separate stages at which the labels are affixed to the first and second object surfaces.

SUMMARY OF THE INVENTION

According to various aspects of the present disclosure, a bonding label having top-side and backing adhesives on opposite sides of a face stock includes a release liner for protecting the backing adhesive and two separate forms of protection for the top-side adhesive during different stages of intended use. For example, a first form of protection for the top-side adhesive can be provided during manufacture and transport of the bonding labels in bulk and a second form of protection for the top-side adhesive can be provided after the face stock portion of the bonding label is removed (i.e., delaminated) from the release liner and affixed to a first object surface and before the face stock portion of the bonding label is subsequently affixed to a second object surface. Such a bonding label is particularly useful for at least temporarily affixing one form of packaging material inside another form of packaging material. For example, the bonding label can be arranged to better secure or limit the relative motion of an inner package within an outer package.

One such aspect of the disclosure envisions a web of bonding labels comprising a face stock and a release liner. The face stock has a top surface and a bottom surface with both a first adhesive layer and a first release layer on the top surface of the face stock and a second adhesive layer on the bottom surface of the face stock. The release liner has a top surface and a bottom surface with a second release layer on the top surface of the release liner arranged to protect the second adhesive layer on the bottom surface of the face stock and a third release layer on the bottom surface of the release liner. The face stock is separated into a succession of labels carried on the release liner such that each label includes a first complementary area defined on the top surface of the face stock by at least a portion of the first adhesive layer and a second complementary area that is at least as large as the first complementary area defined on the top surface of the face stock by at least a portion of the first release layer. The third release layer on the bottom surface of the release liner is arranged to protect the first adhesive layer within the first complementary area of each label when the succession of labels carried on the release liner is wound into a roll. The first release layer within the second complementary area of each label is arranged to protect the first adhesive layer within the first complementary area of each label when the respective labels are removed from the release liner and folded together.

Each of the labels is preferably arranged to be folded about a designated fold line, and the second complementary area occupied by the first release layer encompasses one or more regions that are mirror projections of the first complementary area occupied by the first adhesive layer across the designated fold line. The first complementary area occupied by the first adhesive layer can be composed of a plurality of disconnected subareas, and the one or more regions of the second complementary area occupied by the first release layer can encompass mirror projections of the disconnected subareas across the designated fold line. Both the disconnected subareas occupied by the first adhesive layer and the regions occupied by the first release layer can be located together on both sides of the designated fold line.

The second adhesive layer can be arranged for affixing the labels to respective first object surfaces with each so-affixed label spanning an object fold line on one of the first object surfaces so that when the respective first object surfaces are folded together about the object fold lines, the first release layer within the second complementary area of each so-affixed label covers the first adhesive layer within the first complementary area of each so-affixed label. The first adhesive layer can be arranged to be affixed to second object surfaces after the first object surfaces are unfolded about their respective object fold lines.

The first object surfaces can comprise respective internal surfaces of an outer package to which the second adhesive layer is arranged to be affixed, and the second object surfaces can comprise respective external surfaces of an inner package to which the first adhesive layer is arranged to be affixed. Upon application of the labels to the respective internal surfaces of the outer package, the outer package can be folded together for transport or storage in advance of a separate operation for unfolding the outer package and affixing the inner package to the labels within the outer package. The first adhesive layer and the second adhesive layer can be composed of different adhesives for adhering to different packaging materials.

The first release layer can be printed on the top surface of the face stock in a succession of patterns such that each label includes a pattern of the first release layer and a pattern of the first adhesive layer. For example, the first adhesive layer can flood coated on the top surface of the face stock, and the first release layer can be printed over portions of the first adhesive layer on the top surface of the face stock in the succession of patterns. Alternatively, the first adhesive layer can also be printed on the top surface of the face stock in a succession of patterns such that each label includes a printed pattern of the first release layer and a printed pattern of the first adhesive layer. The third release layer can be flood coated on the bottom surface of the release liner to avoid a pattern alignment requirement with the pattern of the first adhesive layer when the succession of labels carried on the release liner is wound into a roll. The labels can be separated by die cuts against the release liner.

According to another aspect of the present disclosure, an outer package arranged for securing an inner package comprises a packaging material having at least one object fold line. A label includes a face stock having a top surface and a bottom surface with both a first adhesive layer and a release layer on the top surface of the face stock and a second adhesive layer on the bottom surface of the face stock. The label has a first complementary area defined on the top surface of the face stock by at least a portion of the first adhesive layer and a second complementary area that is at least as large as the first complementary area defined on the top surface of the face stock by at least a portion of the first release layer. The second adhesive layer affixes the label to the packaging material in a location straddling the object fold line of the packaging material, and the packaging material is folded together about the object fold line such that release layer within the second complementary area of the label covers the first adhesive layer within the first complementary area of the label.

The packaging material can be arranged to be at least partly unfolded and reshaped as an outer package within which the first adhesive layer is exposed for securing an inner package within the outer package. The first adhesive layer and the second adhesive layer can be composed of different adhesives for adhering to different packaging materials. The first complementary area occupied by the first adhesive layer can be composed of a plurality of disconnected subareas. The label can be arranged to be folded about a designated fold line, and the second complementary area occupied by the release layer can encompass regions that are mirror projections of the disconnected subareas across the designated fold line. Both the disconnected subareas occupied by the first adhesive layer and the regions occupied by the release layer can be located together on both sides of the designated fold line. For different reasons, the second complementary area occupied by the release layer can include regions on both sides of the designated fold line.

According to yet another aspect of disclosure includes a packaging system including an outer package having an interior surface with an object fold line, an inner package within the outer package, and a label including a face stock having a top surface and a bottom surface with both a first adhesive layer and a release layer on the top surface of the face stock and a second adhesive layer on the bottom surface of the face stock. The label has a first complementary area defined on the top surface of the face stock by at least a portion of the first adhesive layer and a second complementary area defined on the top surface of the face stock by at least a portion of the first release layer. The second adhesive layer affixes the label to the interior surface of the outer package in a location straddling the object fold line such that the second complementary area occupied by the release layer encompasses one or more regions that are mirror projections of the first complementary area occupied by the first adhesive layer across the object fold line. The first adhesive layer within the first complementary area affixes the label to the inner package so that the inner package is attached to the outer package via the label.

The first complementary area occupied by the first adhesive layer can be composed of a plurality of disconnected subareas, and the one or more regions of the second complementary area occupied by the release layer can encompass mirror projections of the disconnected subareas across the object fold line.

BRIEF DESCRIPTION OF THE DRAWING FIGURES

DETAILED DESCRIPTION OF THE INVENTION

Figure 1:
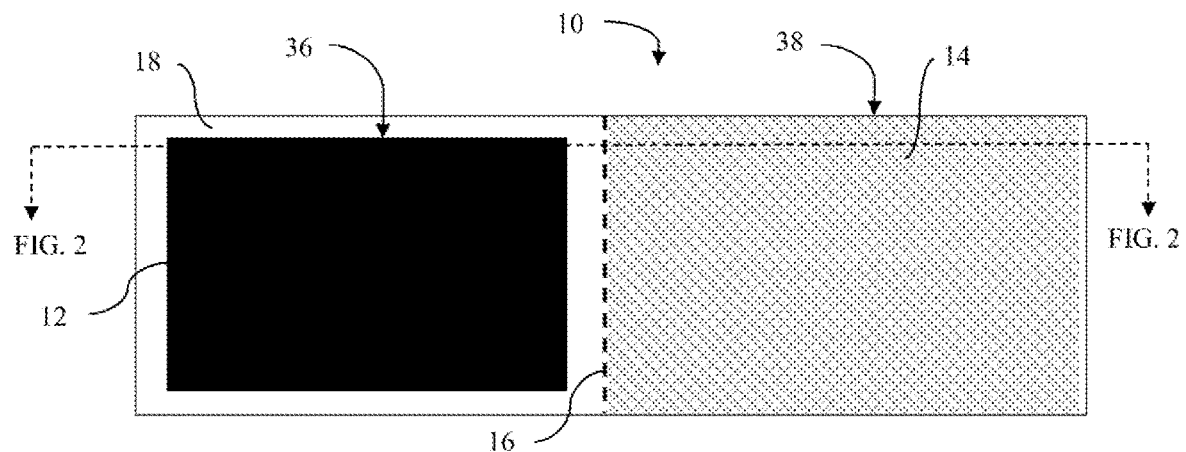
FIG. 1 is a top plan view of a first example of a bonding label in which an undivided complementary area of a top-side adhesive on a top surface of the bonding label is matched with a complementary area of a top-side release on the opposite side of a designated fold line.
Figure 2:
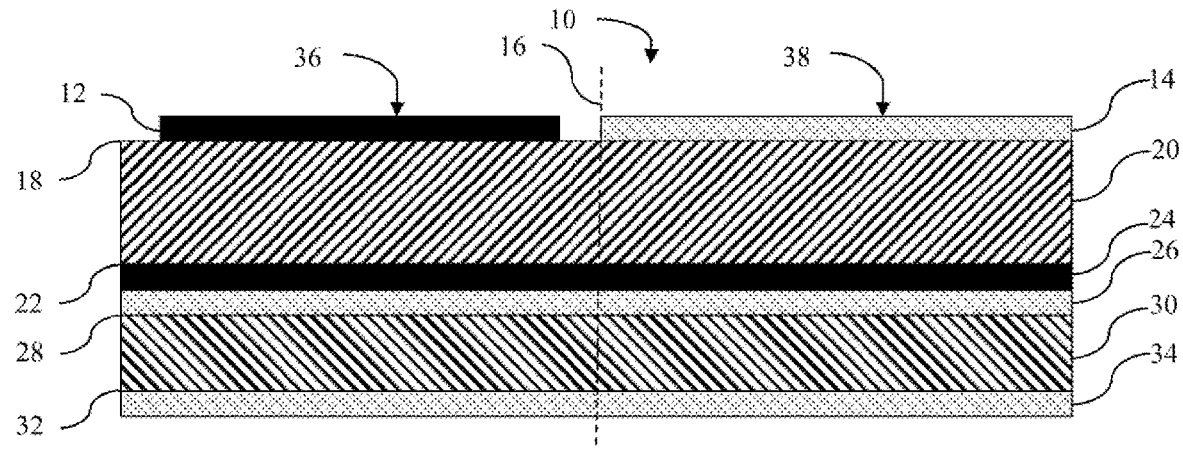
FIG. 2 is a cross-sectional side view of the bonding label of FIG. 1 showing a layered construction that is greatly expanded in a thickness to more easily view the individual layers of the construction.

A bonding label 10 as depicted in FIGS. 1 and 2 includes two substrates in the form of a face stock 20 and a release liner 30. The face stock 20 can be made of a paper, film, composite, hybrid, or other material capable of supporting unstructured layers such as coatings suitable for its intended use. The release liner 30 can be made of a similar set of materials including calendered Kraft paper, biaxially oriented polypropylene (BOPP), and polyester film capable of supporting release coatings suitable for its intended use.

A top surface 18 of the face stock 20 supports a first adhesive layer 12 as a top-side adhesive and a first release layer 14 as a top-side release on opposite sides of a designated fold line 16 that bisects the bonding label 10. A bottom surface 22 of the face stock 20 supports a second adhesive layer 24 as a backing adhesive. While for many applications, the top-side and backing adhesives are expected to be chosen as pressure-sensitive adhesives, the top-side and backing adhesives can take other forms such as heat seal, co-adhesive, and UV activated adhesives and can differ from one another to provide desired characteristics of a permanent, removable, repositionable or any other adhesive technology that fits the end use requirements. The release is typically a crosslinkable silicone but can take other forms such as other coatings or materials having low surface energy or otherwise matched to the adhesive it is intended to protect. For example, the top-side release of the first release layer 14 is matched to the top-side adhesive of the first adhesive layer to temporarily cover and protect the top-side adhesive while the bonding label 10 is folded together about the designated fold line 16 so that the top-side adhesive can be later separated from the top-side release without damaging its intended adhesive properties.

A top surface 28 of the release liner 30 supports a second release layer 26 as an intermediate release in contact with the second adhesive layer 24. A bottom surface 32 of the release liner 30 supports a third release layer 34 as a bottom-side release. While the intermediate release of the second release layer 26 is matched to the backing adhesive of the second adhesive layer 24, the bottom-side release of the third release layer 34, like the top-side release of the first layer 14, is matched to the top-side adhesive of the first adhesive layer 12. The bottom-side release of the third release layer 34 covers and protects the top-side adhesive of the first adhesive layer 12 while the bonding label 10 as a succession of bonding labels along a web is wound into a roll for transport of storage.

The top-side adhesive of the first adhesive layer 12 occupies an undivided but limited complementary area 36 defined on the top surface 18 of the face stock 20. The top-side release of the first release layer 14 occupies an undivided but larger complementary area 36 defined on the top surface 18 of the face stock 20. The complementary area 38 occupied by the top-side release is positioned so that the complementary area 36 occupied by the top-side adhesive is completely covered by the top-side release when the bonding label 10 or at least the face stock 20 and its supported layers are folded together about the designated fold line 16. In other words, the complementary area 38 of the top-side release encompasses the mirror projection of the complementary area 36 of the top-side adhesive across the designated fold line 16 as well as any additional remaining area to increase a tolerance for overlap or other purposes. While encompassing the mirror projection of the complementary area 36, the complementary area 38 of the top-side release can be larger than or even a different shape from the mirror projection of the complementary area 36 of the top-side adhesive. Both the complementary area 36 of the top-side adhesive and the complementary area 38 of the top-side release can be pattern printed on the top surface 18 of the face stock 20. The printing can be performed by a variety of processes including flexographic, screen, gravure, and digital printing techniques, as well as hybrid arrangements of known printing processes. The other layers 24, 26, and 32 of release and adhesive can be more economically flood coated over their respective supporting surfaces 22, 28, and 32, but other printing techniques can be used as well. Exposed areas as well as areas underlying the top-side adhesive and the top-side release on the top surface 18 of the face stock 20 can also be printed with conventional ink for such purposes as providing instructions, labeling information, or fiducial markers for positioning the bonding label 10 during use. For example, a marking designating the designated fold line 16 can be printed on the top surface 18 of the face stock 20. Alternatively, such a marking can be formed by creases or scores in the face stock 20, particularly for face stocks that might otherwise resist folding, or the designated fold line 16 can be made apparent from the patterns of the top-side adhesive and release or from other features of the label 10.

Figure 3:
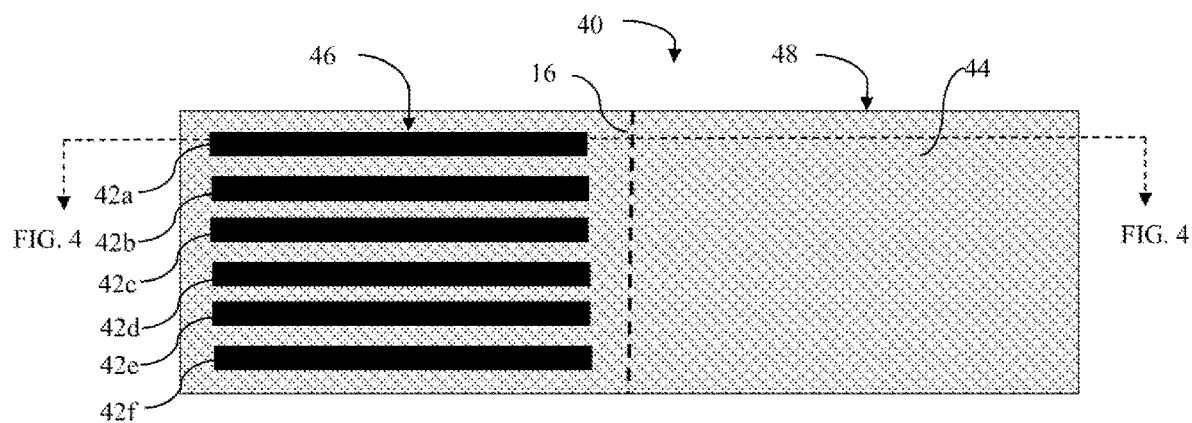
FIG. 3 is a top plan view of a second example of a bonding label in which complementary areas of a top-side adhesive and a top-side release are formed in a different way.
Figure 4:
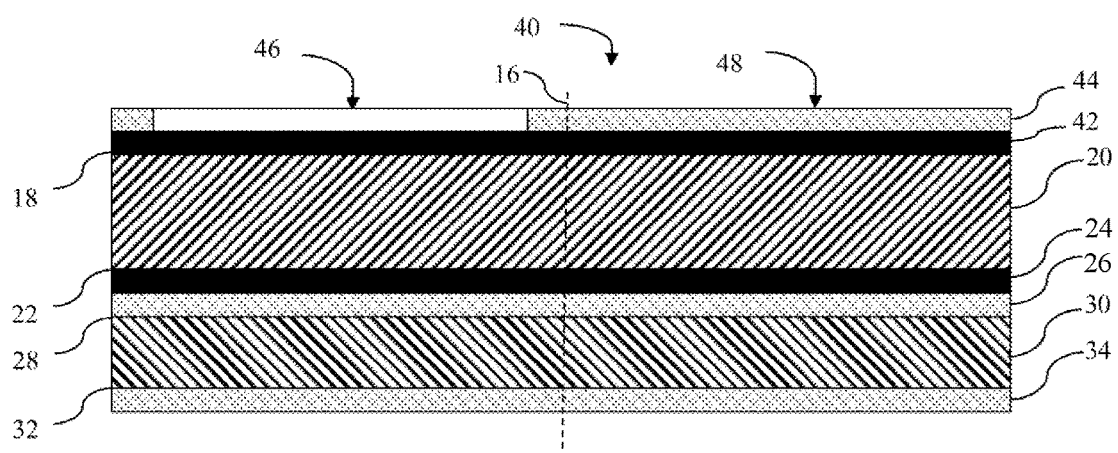
FIG. 4 is a cross-sectional side view of the bonding label of FIG. 3.

Bonding label 40 depicted in FIGS. 3 and 4 is similar to the bonding label 10 with like reference characters designating corresponding structures. However, a first adhesive layer 42 is shown flood coated over the top surface 18 of the face stock 20, and a first release layer 44 is pattern printed over the first adhesive layer 42. A top-side release of the first release layer 44 is formulated or otherwise arranged with respect to a top-side adhesive of the first adhesive layer 42 to deaden any areas of the first adhesive layer 42 that are overlapped by the first release layer 44 while retaining desired release properties. In the illustrated pattern of the first release layer 42, the remaining complementary area 46 of still functional top-side adhesive comprises a set of separated subareas 42a through 42f in the form of stripes. While each of the subareas 42a through 42f that collectively define a complementary area 46 occupied by the top-side adhesive appear in the cross-sectional view of FIG. 4 as if recessed within windows through the first release layer 44, the complementary area 46 of the top-side adhesive effectively remains exposed at nearly the same level as the remaining complementary area 48 of the top-side release at the actual thickness of the bonding label 40.

Although the subareas 42a through 42f of the top-side adhesive are shown in the form of stripes, the top-side adhesive of the first adhesive layer 42 can be printed in any desired pattern such that the subareas of the top-side adhesive can be varied in size, shape, number, and position as desired for a given application. For example, the subareas can be fashioned as dots, outlines, polygons, swirls, or any freeform shape or combinations thereof and arranged in evenly distributed, progressively varying, or irregular patterns to suit the desired application. The complementary area 48 of the top-side release can be sized and shaped in either a divided or undivided format so that when folded about the designated fold line 16, the complementary area 48 of the top-side release covers the complementary area 46 of the top-side adhesive. Alternatively, separate deadening and release layers could be pattern printed to provide the desired complementary areas 46 and 48 for the functions of adhesion and release. Like the first adhesive layer 42, portions of the first release layer 44 that are not needed to protect the complementary area 46 of the top-side adhesive can be overprinted for one or more purposes and thereby excluded from the complementary area 48 of the top-side release.

Figure 5:
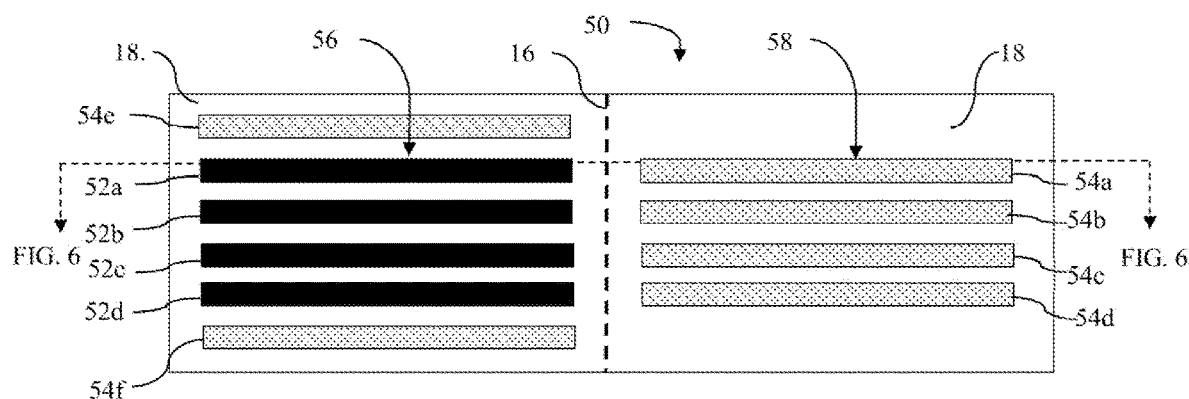
FIG. 5 is a top plan view of a third example of a bonding label in which complementary areas of the top-side adhesive and the top-side release are formed in as mirror symmetric subareas on opposite sides of a designated fold line.
Figure 6:
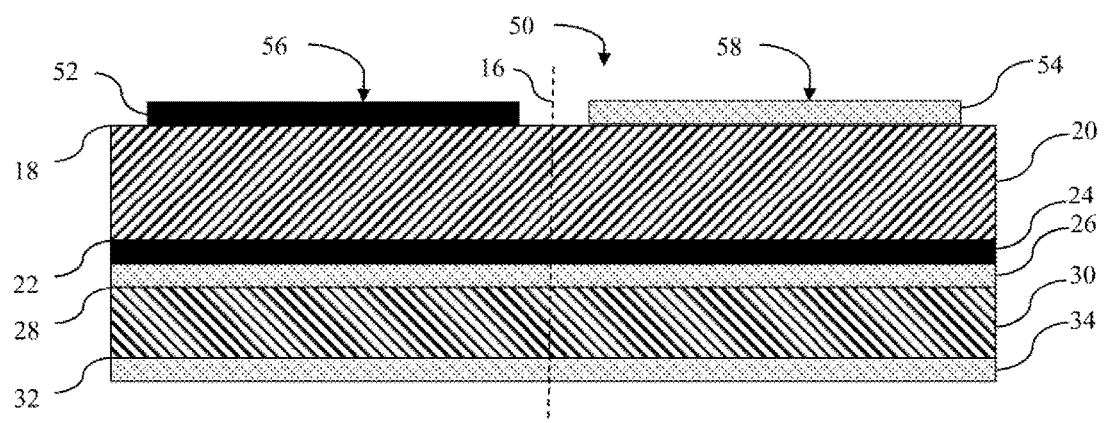
FIG. 6 is a cross-sectional side view of the bonding label of FIG. 5.

Bonding label 50 depicted in FIGS. 5 and 6 is similar to the bonding labels 10 and 40 except for the arrangement of the top-side adhesive and top-side release. Both a first adhesive layer 52 and a first release layer 54 are pattern printed on the top surface 18 of the face stock 20. The first adhesive layer 52 is printed in four separate subareas 52a through 52d in the form of lateral stripes, which together define a complementary area 56 occupied by the top-side adhesive. The first release layer is printed in six separate subareas 54a through 54f, also in the form of lateral stripes However, only the subareas 54a through 54d contribute to a complementary area 58 that is intended to cover and protect the complementary area 56 of the top-side adhesive when folded together about the designated fold line 16. The subareas 54e and 54f of the top-side release on the same side of the designated fold line 16 as the subareas 52a through 52d of the top-side adhesive can be arranged for other purposes. In the bonding label 50, the subareas 54a and 54d of the top-side release are arranged as exact mirror projections of the subareas 52a through 52d of the top-side adhesive across the designated fold line 16. However, each of the subareas 54a and 54d of the top-side release are preferably larger than the subareas 52a through 52d of the top-side adhesive or are combined into an otherwise larger area to provide some tolerance for assuring that the complementary area 56 of the top-side adhesive is covered by the complementary area 58 of the top-side release in the folded condition.

Figure 7:
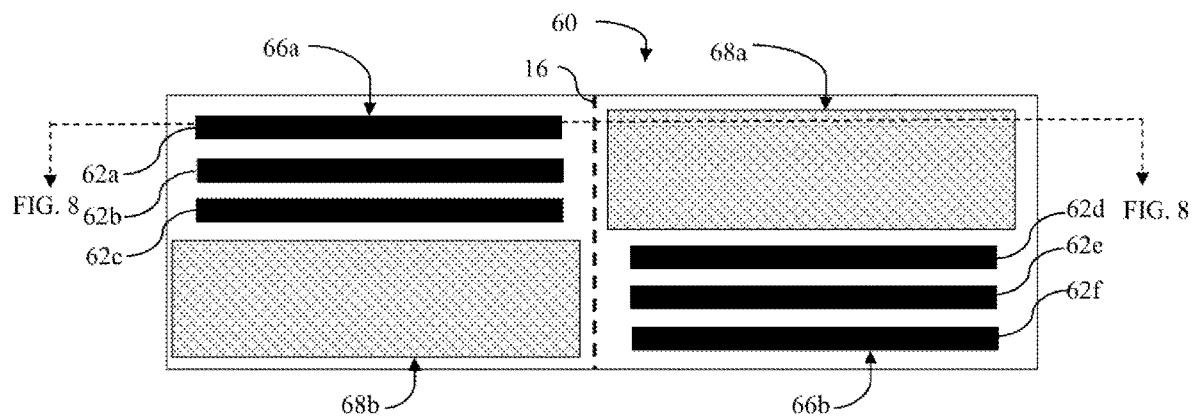
FIG. 7 is a top plan view of a fourth example of a bonding label in which complementary areas of the top-side adhesive and the top-side release are printed together on both sides of the designated fold line.
Figure 8:
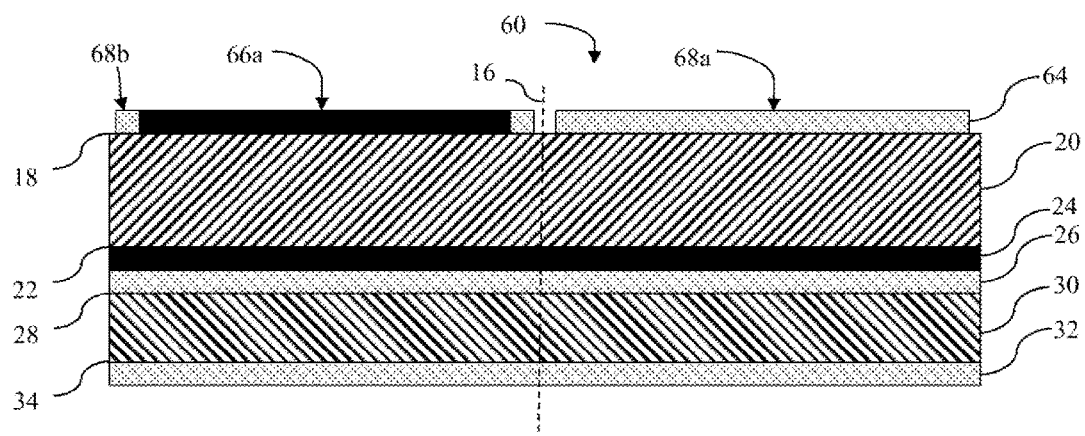
FIG. 8 is a cross-sectional side view of the bonding label of FIG. 7.

Bonding label 60 depicted in FIGS. 7 and 8 is similar to the bonding labels 10, 40, and 50 but again differs in the arrangement of the top-side adhesive and top-side release. Both a first adhesive layer 62 and a first release layer 64 are pattern printed on the top surface 18 of the face stock 20. The first adhesive layer 52 is printed in three separate subareas 62a through 62c in the form of lateral stripes on the left side of the designated fold line 16 and is printed in three other separate subareas 62d through 62f in the form of lateral stripes on the right side of the designated fold line 16. The subareas 62a through 62c define a complementary area 66a occupied by the top-side adhesive on the left side of the designated fold line 16 and the subareas 62d through 62f define a complementary area 66b occupied by the top-side adhesive on the right side of the designated fold line 16. The first release layer 64 is printed in two separate undivided complementary areas 68a and 68b on opposite sides of the designated fold line 16. The complementary area 68a of the top-side release on the right side of the designated fold line 16 is arranged to encompass a mirror projection of the complementary area 66a of the top-side adhesive on the left side of the designated fold line 16. Similarly, the complementary area 68b of the top-side release on the left side of the designated fold line 16 is arranged to encompass a mirror projection of the complementary area 66b of the top-side adhesive on the right side of the designated fold line 16. Together, the complementary areas 68a and 68b of the top-side release cover and protect the complementary areas 66a and 66b of the top-side adhesive when folded together about the designated fold line 16.

As with any of the envisioned bonding labels, the top-side adhesive of the first adhesive layer 62 can be printed in any desired pattern such that the subareas of the top-side adhesive can be varied in size, shape, number, and position as desired for a given application. The top-side release of the first release layer 64 can also take a variety of divided or undivided forms encompassing mirror projections of the complementary areas of the top-side adhesive on opposite sides of the designated fold line 16. Similarly, the shape and size of the bonding label 60 as well as any of the other bonding labels 10, 40, or 50 as described herein can vary to fit its intended application. However, for purposes of protecting the bonding labels in a folded condition, the shape of the bonding labels is arranged to support a complementary area of release that encompasses a mirror projection of a complementary area of adhesive across a designated fold line. In addition, although the bonding labels 10, 40, 50, and 60 are depicted as individual labels in isolation, the various bonding labels are preferably formed as a succession of labels along a web in which the release liner 30 extends in an uninterrupted form along the length of the web.

Figure 9:
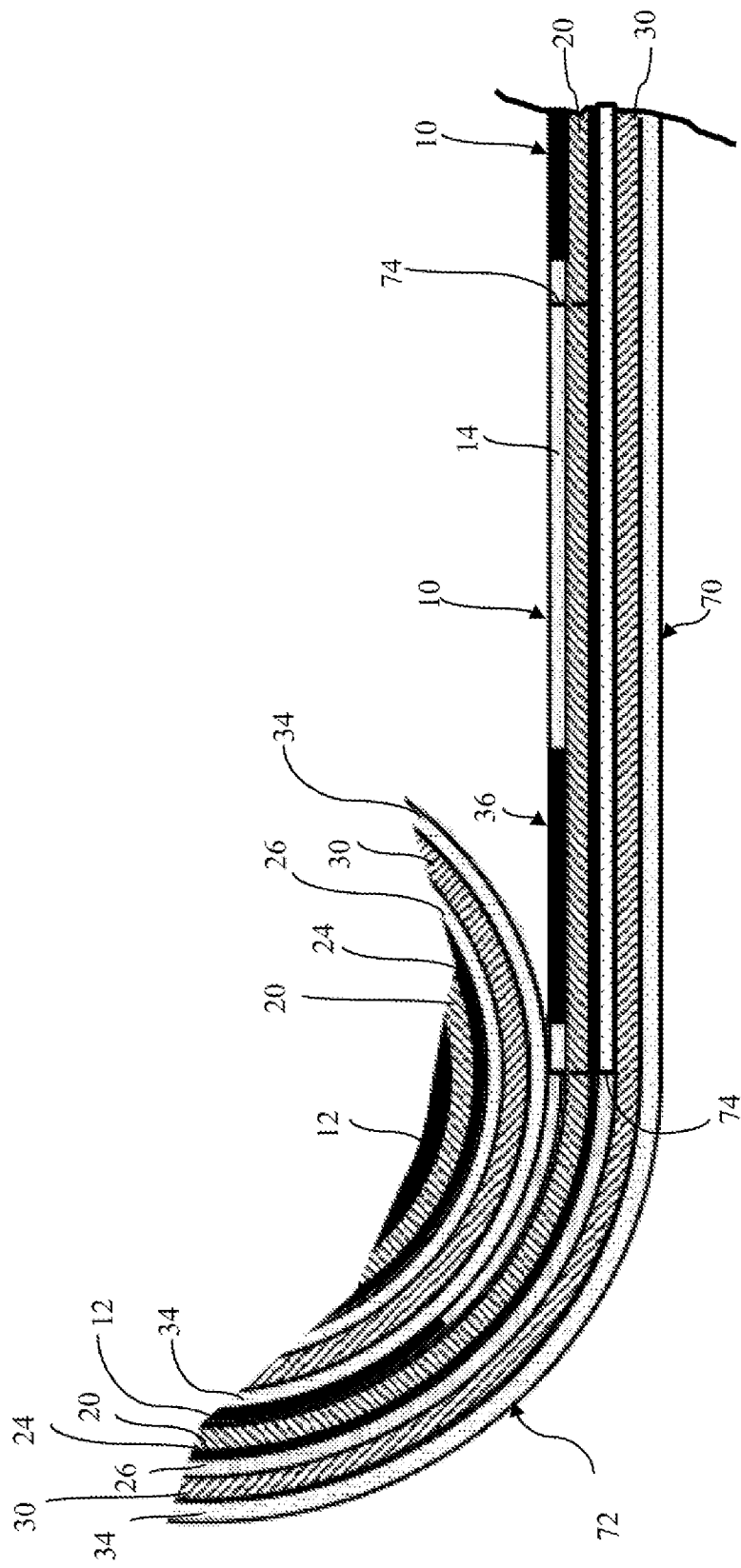
FIG. 9 is a cross-sectional side view of a web of the bonding labels based on the bonding label of FIGS. 1 and 2 that is partially wound into a roll.

For example, FIG. 9 depicts a web 70 comprising a succession of the bonding labels 10 wound into a roll 72 for transport or storage. Die cuts (i.e., top scores) 74 through the face stock 20 separate the bonding labels 10 along the web 70 leaving the release liner 30 intact as a transport, handling, and protection mechanism for the bonding labels 10. Additional die cutting together with matrix removal can be used to further separate or otherwise ready the labels for automated dispensing or for other purposes. Within the roll 72, the third release layer 34 on the bottom surface 32 of the release liner 30 covers and protects the complementary area 36 of the top-side adhesive within the adhesive layer 12 on the top surface 18 of the face stock 20. The uninterrupted form of the third release layer 34 provides for covering and protecting the complementary areas 36 of the adhesive layer 12 independently of any registration between the overlapping bonding labels 10 to avoid any occurrence of "blocking" or seizing together within the roll 72 during storage or transport of the web 70. The third release layer 34 also allows the web 70 to be unrolled so that the face stock portion of the blocking labels 10 (also often referred to as labels in and of themselves) can be removed from the web 70, i.e., separated from the release liner 30, and affixed to a desired object surface. While the web 70 is depicted with an inside wind, an outside wind could be used to similar effect. Although the web 70 is formed by a succession of the blocking labels 10, the web 70 can comprise a succession of any of the blocking labels 40, 50, or 60 as depicted and as described.

The web 70 can be made on a single press or on multiple presses in a succession of stages. For example, separate rolls of the face stock 20 and the release liner 30 can be fed into a press along which the various layers 12, and 24 of adhesive and the various layers 14, 26, and 34 of release can be applied to the face stock 20 and the release liner 30 in a series of coating or printing operations while also laminating the coated face stock to the coated release liner before winding the web into a roll. Alternatively, a web of conventional label stock comprising the face stock 20 with an adhesive backing layer 24 laminated to the release liner 30 via the intermediate release layer 26 can be fed into a press for applying the adhesive and release layers 12 and 14 to the top surface 18 of the face stock 20 and applying the release layer 34 to the bottom surface 32 of the release liner 30 before rewinding the web into a roll for transport or storage. The first adhesive layers 12, 52, and 62 of the bonding labels 10, 50, and 60 are preferably pattern printed while the first adhesive layer 42 of the bonding label 40 is preferably flood coated. Pattern printing is also preferably used for applying the first release layers 14, 44, 54, and 64.

Figure 10:
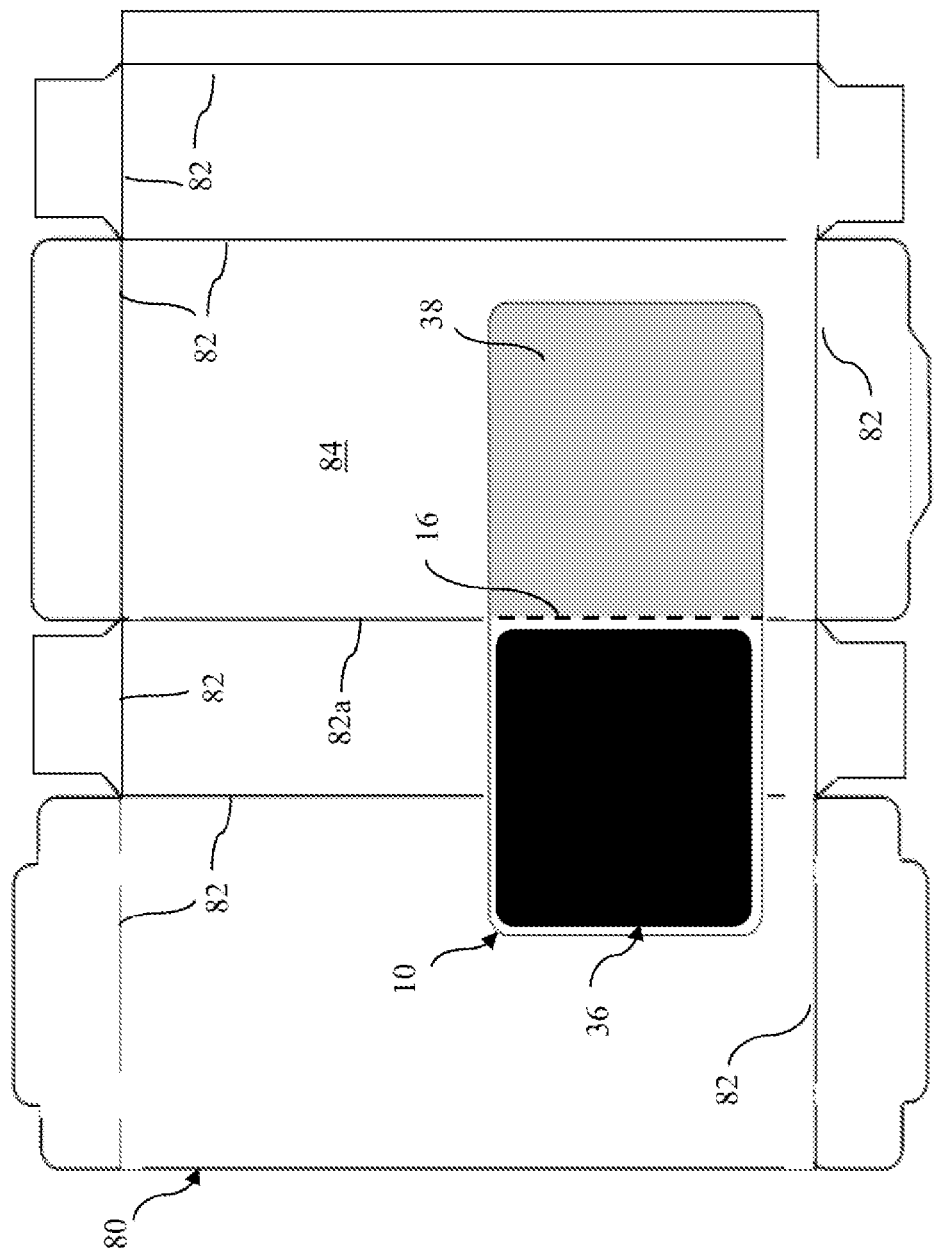
FIG. 10 is a top plan view of an interior surface an outer package in a flattened state with a bonding label removed from the release liner along the web and affixed to the interior surface straddling an object fold line of the outer package.

FIG. 10 depicts a flattened outer package 80 arranged as a type of packaging material that is intended to be folded into a three-dimensional form such as a box, carton, or other container. The outer package includes a plurality of object fold lines 82, which can be formed as creases or scores in an internal surface 84 of the outer package 80 or can merely correspond to internal die lines of a template from which the packaging material is shaped into the outer package 80. For purposes of storage or transport, the outer package 80 is intended to be folded together about a particular object fold line 82a. The face stock portion of the bonding label 10, which has been removed from the web 70 is affixed to the internal surface 84 in a position that aligns the designated fold line 16 of the bonding label with the object fold line 82a of the outer package 80. The face stock portions of any of the bonding labels 40, 50, or 60 as described herein can be similarly affixed. This affixing process can be automated by an applicator within which the web 70 can be unrolled and the individual bonding labels 10 (devoid of the release liner) can be stripped from the web 70 and applied to a succession of flattened outer packages 80. The applicator can be incorporated into a process or machine in which the outer package 80 is itself formed by die cuts through a packaging material.

The face stock portion of the bonding labels 10, which are separated from one another by the die cuts 74, can be stripped from the web 70 by separating the second adhesive layer 24 carried on the back surface 22 of the face stock from the second release layer 26 carried on the release liner 30. The second adhesive layer 24 affixes the bonding label 10 (devoid of its release liner) to the internal surface 84 of the outer package. The backing adhesive of the second adhesive layer 24 can be matched to the surface and material characteristics of the packaging material to which it is intended to be affixed. Since, the second adhesive layer spans both sides of the designated fold line 16, the face stock portion of the bonding label 10 is adhered to the interior surface 84 of the outer package on both sides of the object fold line 82a. The remaining release liner 30 can be rerolled for recycling.

In the view of FIG. 10, both the complementary area 36 occupied by the top-side adhesive and the complementary area 38 occupied by the top-side release are exposed on the internal surface 84 of the outer package 80. While the exposed area of the top-side adhesive is intended for securing an inner package or other article within the outer package 80, the process for assembling the outer package 80 and affixing the inner package or other article within the outer package 80 typically takes place at a different location or subsequent time during which the exposed adhesive requires protection against environmental interactions or unintended contact with other surfaces. The outer package 80 is arranged to be folded together about the object fold line 82a, and the face stock portion of the bonding label 10, whose designated fold line 16 is aligned with the object fold line 82a, is folded together with the outer package 80. In this way, the outer package 80 can be stored and transported for later use while protecting the top-side adhesive within the complementary area 36.

Figure 11:
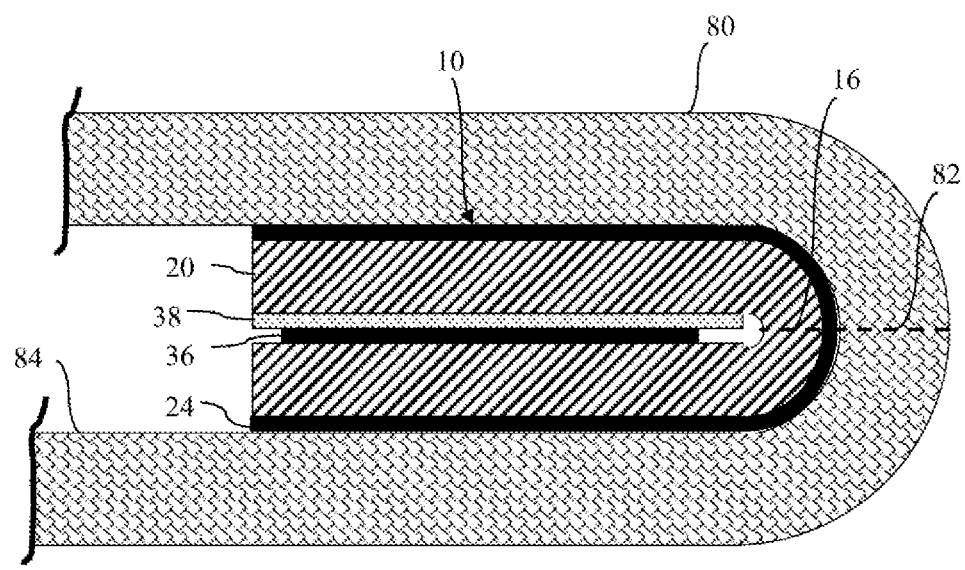
FIG. 11 is a cross-sectional side view of a portion of the outer package and the bonding label of FIG. 10 folded together about the object fold line.

FIG. 11 shows a portion of the outer package 80 and the face stock portion of the bonding label 10 folded together about their respective fold lines 82a and 16. Once again, the thicknesses of the layers have been greatly enlarged for purposes of more clearly showing the layers. In this folded condition, the complementary area 36 of the top-side adhesive is completely covered by the complementary are 38 of the top-side release to protect the top-side adhesive until the outer package 80 is assembled and otherwise readied to receive its intended contents. Similarly, the complementary areas 46, 56, and 66a and 66b of top-side adhesive in the bonding labels 40, 50, and 60 are matched by the complementary areas 48, 58, and 68a and 68b of the top-side release that encompasses mirror projections of the complementary areas 46, 56, and 66a and 66b across the designated fold line 16 of these bonding labels. Thus, when the face stock portions of any of these bonding labels 10, 40, 50, or 60 are folded together with the outer package 80, the complementary areas 36, 46, 56, and 66a and 66b of top-side adhesive are covered by the matching complementary areas 38, 48, 58, and 68a and 68b of the top-side release. The top-side adhesive within the complementary areas 36, 46, 56, and 66a and 66b remains protected until the outer package 80 is unfolded and reshaped into its desired form, wherein the same complementary areas 36, 46, 56, and 66a and 66b of the top-side adhesive are exposed for intended use for bonding to an inner package.

Figure 12:
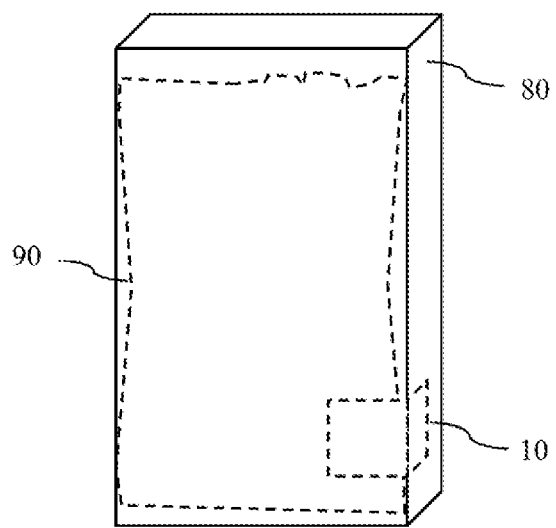
FIG. 12 is a perspective view of the outer package of FIGS. 10 and 11 shaped into a box for receiving an inner package (shown by hidden line) that is affixed to the outer package by the bonding label (also shown by hidden line).

In FIG. 12, the outer package 80 in an assembled state is shown as a box with an inner package 90 shown as a deformable bag within the outer package 80. The face stock portion of the bonding label 10, which is affixed to the interior surface 84 of the outer package via the second adhesive layer 22, is also affixed to an outer surface of the inner package 90 via the first adhesive layer 12. That is, the complementary area 36 of the top-side adhesive bonds the backing label 10 to the inner package 90 for attaching the inner package 90 to the outer package 80. The top-side adhesive of the first adhesive layer 12 can be matched to the surface and material characteristics of the packaging material with which the inner package 90 is made and can differ from the adhesive used to affix the face stock portion of the bonding label to the outer package 80. The continuous or discontinuous patterns of the complementary areas 36, 46, 56, and 66a and 66b of top-side adhesive in any of the bonding labels 10, 40, 50, and 60 can also be selected to form an appropriate bond with the inner package 90 as the inner package 90 is placed or filled within the outer package 80.

The inner and outer packages that can be bound together by the envisioned bonding labels can take a variety of forms and can be made from a variety of materials. For example, either one of the outer or inner packages can have a fixed or more amorphous shape. For example, the outer package can take the form of a box, carton, tray, or tube and the inner package can take the form of a bag, bottle, packet, canister, tube, or other container for holding dry or wet materials or can comprise a product itself. The bonding labels can be used to secure the inner packages within outer packages and to limit at least some relative motion that might otherwise damage the inner packages or their contents. The bonding labels can also be used to provide tamper evidency or otherwise discourage the removal of a product from its outer packaging.

Those of skill in the art will appreciate that the bonding labels described herein particularly such bonding labels having top-side adhesive is protected by different layers of release in different states of use, can be used in various ways for bonding one object surface to another. Although described with respect to a limited number of examples, additional changes, modifications, and uses will be apparent within the overall teaching as understood by those of skill in the art.

The invention claimed is:

1. A web of bonding labels comprising:
a face stock having a top surface and a bottom surface with both a first adhesive layer and a first release layer on the top surface of the face stock and a second adhesive layer on the bottom surface of the face stock;
a release liner having a top surface and a bottom surface with a second release layer on the top surface of the release liner arranged to protect the second adhesive layer on the bottom surface of the face stock and a third release layer on the bottom surface of the release liner;
the face stock being separated into a succession of labels carried on the release liner such that each label includes a first complementary area defined on the top surface of the face stock by at least a portion of the first adhesive layer and a second complementary area that is at least as large as the first complementary area defined on the top surface of the face stock by at least a portion of the first release layer;
the third release layer on the bottom surface of the release liner being arranged to protect the first adhesive layer within the first complementary area of each label when the succession of labels carried on the release liner is wound into a roll; and
the first release layer within the second complementary area of each label being arranged to protect the first adhesive layer within the first complementary area of each label when the respective labels are removed from the release liner and folded together.

2. The web of claim 1, wherein each of the labels is arranged to be folded about a designated fold line, and the second complementary area occupied by the first release layer encompasses one or more regions that are mirror projections of the first complementary area occupied by the first adhesive layer across the designated fold line.

3. The web of claim 2, wherein the first complementary area occupied by the first adhesive layer is composed of a plurality of disconnected subareas, and the one or more regions of the second complementary area occupied by the first release layer encompass mirror projections of the disconnected subareas across the designated fold line.

4. The web of claim 3, wherein both the disconnected subareas occupied by the first adhesive layer and the regions occupied by the first release layer are located together on both sides of the designated fold line.

5. The web of claim 1, wherein the second adhesive layer is arranged for affixing the labels to respective first object surfaces with each so-affixed label spanning an object fold line on one of the first object surfaces so that when the respective first object surfaces are folded together about the object fold lines, the first release layer within the second complementary area of each so-affixed label covers the first adhesive layer within the first complementary area of each so-affixed label.

6. The web of claim 5 in which the first adhesive layer is arranged to be affixed to second object surfaces after the first object surfaces are unfolded about their respective object fold lines.

7. The web of claim 6, wherein the first object surfaces comprise respective internal surfaces of an outer package to which the second adhesive layer is arranged to be affixed, and the second object surfaces comprise respective external surfaces of an inner package to which the first adhesive layer is arranged to be affixed.

8. The web of claim 7, wherein upon application of the labels to the respective internal surfaces of the outer package, the outer package can be folded together for transport or storage in advance of a separate operation for unfolding the outer package and affixing the inner package to the labels within the outer package.

9. The web of claim 6, wherein the first adhesive layer and the second adhesive layer are composed of different adhesives for adhering to different packaging materials.

10. The web of claim 1, wherein the first release layer is printed on the top surface of the face stock in a succession of patterns such that each label includes a pattern of the first release layer and a pattern of the first adhesive layer.

11. The web of claim 10, wherein the first adhesive layer is flood coated on the top surface of the face stock, and the first release layer is printed over portions of the first adhesive layer on the top surface of the face stock in the succession of patterns.

12. The web of claim 10, wherein the first adhesive layer is printed on the top surface of the face stock in a succession of patterns such that each label includes a printed pattern of the first release layer and a printed pattern of the first adhesive layer.

13. The web of claim 10, wherein the third release layer is flood coated on the bottom surface of the release liner to avoid a pattern alignment requirement with the pattern of the first adhesive layer when the succession of labels carried on the release liner is wound into a roll.

14. The web of claim 1, wherein the labels are separated by die cuts against the release liner.

15. An outer package arranged for securing an inner package comprising:
a packaging material having at least one object fold line;
a label including a face stock having a top surface and a bottom surface with both a first adhesive layer and a release layer on the top surface of the face stock and a second adhesive layer on the bottom surface of the face stock;
the label having a first complementary area defined on the top surface of the face stock by at least a portion of the first adhesive layer and a second complementary area that is at least as large as the first complementary area defined on the top surface of the face stock by at least a portion of the first release layer;
the second adhesive layer affixing the label to the packaging material in a location straddling the object fold line of the packaging material; and
the packaging material being folded together about the object fold line such that release layer within the second complementary area of the label covers the first adhesive layer within the first complementary area of the label.

16. The outer package of claim 15, wherein the packaging material is arranged to be at least partly unfolded and reshaped as an outer package within which the first adhesive layer is exposed for securing an inner package within the outer package.

17. The outer package of claim 16, wherein the first adhesive layer and the second adhesive layer are composed of different adhesives for adhering to different packaging materials.

18. The outer package of claim 15, wherein the first complementary area occupied by the first adhesive layer is composed of a plurality of disconnected subareas.

19. The outer package of claim 18, wherein the label is arranged to be folded about a designated fold line, and the second complementary area occupied by the release layer encompasses regions that are mirror projections of the disconnected subareas across the designated fold line.

20. The outer package of claim 19, wherein both the disconnected subareas occupied by the first adhesive layer and the regions occupied by the release layer are located together on both sides of the designated fold line.

21. The outer package of claim 15, wherein the label is arranged to be folded about a designated fold line, and the second complementary area occupied by the release layer includes regions on both sides of the designated fold line.

22. A packaging system comprising:
an outer package having an interior surface with an object fold line;
an inner package within the outer package;
a label including a face stock having a top surface and a bottom surface with both a first adhesive layer and a release layer on the top surface of the face stock and a second adhesive layer on the bottom surface of the face stock;
the label having a first complementary area defined on the top surface of the face stock by at least a portion of the first adhesive layer and a second complementary area defined on the top surface of the face stock by at least a portion of the first release layer;
the second adhesive layer affixing the label to the interior surface of the outer package in a location straddling the object fold line such that the second complementary area occupied by the release layer encompasses one or more regions that are mirror projections of the first complementary area occupied by the first adhesive layer across the object fold line; and the first adhesive layer within the first complementary area affixing the label to the inner package so that the inner package is attached to the outer package via the label.

23. The packaging system of claim 22, wherein the first complementary area occupied by the first adhesive layer is composed of a plurality of disconnected subareas, and the one or more regions of the second complementary area occupied by the release layer encompass mirror projections of the disconnected subareas across the object fold line.

* * * * *